Feb. 13, 1923.

J. R. GAMMETER.
CUSHION TIRE STRUCTURE.
FILED DEC. 12, 1922.

1,445,014.

Inventor
John R. Gammeter.
By Robert M. Pierson
Atty.

Patented Feb. 13, 1923.

1,445,014

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

CUSHION-TIRE STRUCTURE.

Application filed December 12, 1922. Serial No. 606,381.

*To all whom it may concern:*

Be it known that I, JOHN R. GAMMETER, a citizen of the United States, residing at Akron, in the county of Summit and State of Ohio, have invented a certain new and useful Cushion-Tire Structure, of which the following is a specification.

This invention relates to cushion tires, and particularly cushion tires comprising a tire body recessed from its inner periphery and vulcanized to laterally separated metal rings constituting the tire-base, such tires commonly being mounted upon a permanent rim in pressed-on relation. Tire-bases of this character require means to prevent relative movement, both lateral and rotary, between the two members of the base while the tire is in use as well as in the mounting of the same upon the permanent rim. The chief objects of this invention are to provide effective and economical means for this purpose.

Figure 1:
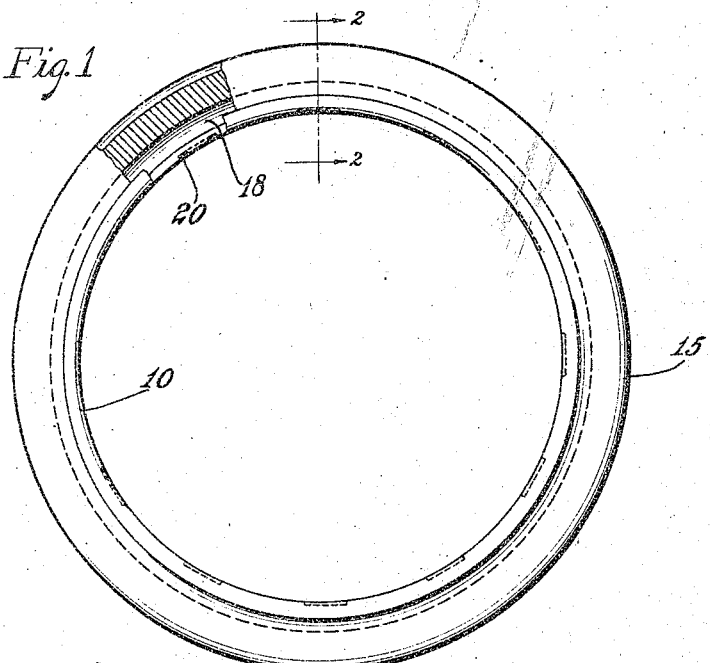
Fig. 1 is a side elevation of a tire, partially in section, embodying a preferred form of my invention.
Figure 2:
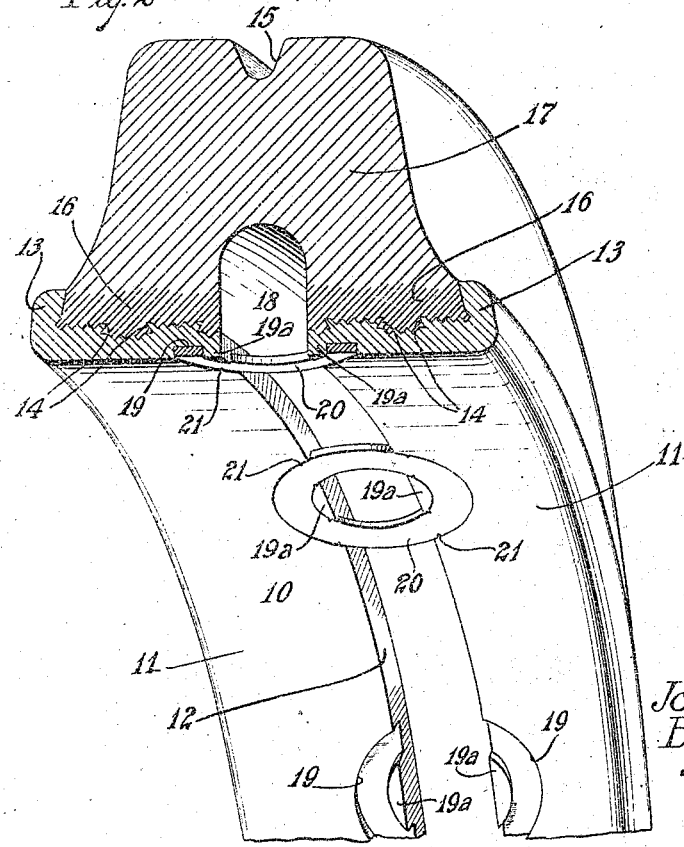
Fig. 2 is a sectional perspective view, sectioned on line 2—2 of Fig. 1.

Referring to the drawings, 10 represents generally an annular metal tire-base comprising two side members or base rings 11, 11, laterally separated from each other by a circumferential slot 12. The side members 11, 11 are provided respectively with integral side flanges 13, 13 and are formed on their outer peripheries with circumferential dove-tail grooves 14, 14 for anchoring thereto the legs of a hollow cushion tire 15, said tire comprising foundation layers of hard rubber compound 16, 16 interlocking with the grooves 14 and a body portion 17 of relatively soft rubber vulcanized to said foundation layer. Within the tire-body 15 is a circumferential cavity or recess 18 in continuation of the slot 12.

Spaced at intervals about the inner periphery of the tire base 10 are pairs of arcuate grooves 19, 19, the grooves of each pair being concentric and their common center lying within the slot 12. Seated in said grooves and snugly fitting the same are annular metallic washers or bridge-members 20, spanning said slot. The grooves 19 are of such diameter and width as to leave upstanding uncut portions or lugs 19ª, 19ª adjoining the slot 12 at each side thereof, and the washers 20, by their engagement with these lugs and with the opposite walls of the grooves, effectually prevent any relative lateral or circumferential movement of the base members 11.

The grooves 19 preferably are milled in the base 10 after the tire has been vulcanized and the cavity forming core removed from the recess 18, the base rings, during such milling, being held in proper relation to each other in any suitable manner, thus assuring that the grooves of each pair will be concentric. The grooves preferably have slightly greater depth than the thickness of the washers, and the metal of the base rings is peened over at several places around each washer as shown at 21, 21 to hold said washers firmly in place. This feature of the invention is particularly desirable for tires of the pressed-on type, as it produces no obstruction on the inner periphery of the tire-base to hinder the mounting of the latter upon the permanent rim or felloe band of a vehicle wheel. The washers 20 may be of such number and strength as to withstand very great pressure in the pressing of the tire structure onto the felloe or permanent rim. While the finished tire is strong and durable, the spacing rings 20 permit the tire-base rings to conform individually to the contour of the permanent rim, and the intervening spaces between said spacing rings permit ventilation of the internal cavity of the tire, when the permanent rim is so formed, or so irregularly fits the tire-base rings, as to permit the passage of air.

The spacing members 20 are shown as annular washers, and preferably are such, since this form affords simplicity of design and cheapness of manufacture, their seating slots being adapted to be easily and cheaply milled, but I do not wholly limit myself to this particular shape of spacing member.

I claim:

1. A cushion tire structure comprising a pair of laterally separated base members, a tire-body vulcanized to said base members and spanning their intervening space, and a circumferential series of annular spacing members set into the inner peripheries of the rings and bridging the space between the latter.

2. A cushion tire structure comprising a pair of laterally separated tire-base rings, a tire-body vulcanized thereon, and a series of circular, annular bridge members set into arcuate, concentric grooves formed in the inner peripheries of said rings.

In witness whereof I have hereunto set my hand this 9th day of December, 1922.

JOHN R. GAMMETER.